Nov. 23, 1954  W. C. ROGERS  2,694,852
METHOD OF BRAZING AND THE PRODUCT THEREOF
Filed Jan. 13, 1951

INVENTOR
WAYNE C. ROGERS
BY Albert G. Blodgett
ATTORNEY

United States Patent Office 2,694,852
Patented Nov. 23, 1954

2,694,852

METHOD OF BRAZING AND THE PRODUCT THEREOF

Wayne C. Rogers, Worcester, Mass., assignor to Riley Stoker Corporation, Worcester, Mass., a corporation of Massachusetts Application January 13, 1951, Serial No. 205,861

2 Claims. (Cl. 29—195)

This invention relates to a method of brazing and the product thereof, and more particularly to an improved process for bonding two metal bodies to one another with silver solder or the like and to the composite metal article thus produced.

It is a common practice to secure the adjacent flat surfaces of two metal bodies to one another by placing a thin sheet of silver solder or the like between them, with a suitable flux on both sides of the solder, pressing the bodies firmly together, and heating the bodies until the solder is melted. The parts are then allowed to cool (while the pressure is maintained) until the solder has solidified. While this prior practice is fairly satisfactory in some cases, there are other situations in which it results in serious difficulties. For example, if the two bodies are made of different metals having widely different coefficients of heat expansion, severe stresses will arise as the composite article cools, and these stresses may result in cracking of parts or tearing away of the bond. In some cases the flux may segregate over a considerable area and prevent the formation of a proper bond throughout such area. In order to overcome these difficulties it has been proposed to insert a screen of woven copper wire between the two parts, with the expectation that the screen interstices would provide room for excess flux, that the screen wire would be firmly bonded to the two parts to hold them together, and that the wire would yield sufficiently during cooling of the parts to take care of any differential shrinkage and thus prevent damage to the assembly. While there was an improvement in certain respects, it was nevertheless found that the bond between the parts failed to provide adequate strength for certain purposes.

It is accordingly one object of the invention to overcome these difficulties and to provide an improved method of brazing two metal bodies having widely different coefficients of heat expansion, whereby a very strong bond will be obtained without unduly stressing any part of the composite article.

It is a further object of the invention to provide an improved brazed article including two parts formed of different metals very firmly bonded to one another and free from internal stresses.

With these and other objects in view, as will be apparent to those skilled in the art, the invention resides in the steps of the process and the composite article set forth in the specification and covered by the claims appended hereto.

In accordance with the invention a screen of woven wire of a suitable material, such as copper, is treated to form a multiplicity of small flat areas or spots on opposite sides thereof. This is preferably accomplished by feeding the screen between a pair of parallel rotatable rolls having sufficient strength and hardness to deform the wire in the desired manner. After this treatment the flattened screen, together with a suitable brazing compound (such as silver solder) and preferably a suitable flux, is placed between the two metal bodies which are to be joined. The bodies are then pressed or clamped together and heated until the brazing compound melts and distributes itself by capillary action in the narrow spaces formed between the various parts. As the parts cool, the screen will deform slightly to allow differential contraction of the two metal bodies without imposing heavy forces thereon. At the same time the flux and the various impurities collected thereby will flow into the voids among the screen wires. Upon completion of the cooling and removal of the clamping pressure, the two bodies and the interposed screen will be found to be very firmly bonded into a unitary composite article having no appreciable internal stresses.

Referring to the drawings illustrating one embodiment of the invention, and in which like reference numerals indicate like parts, Fig. 1 is a greatly enlarged fragmentary section through a composite article;

Figure 1:
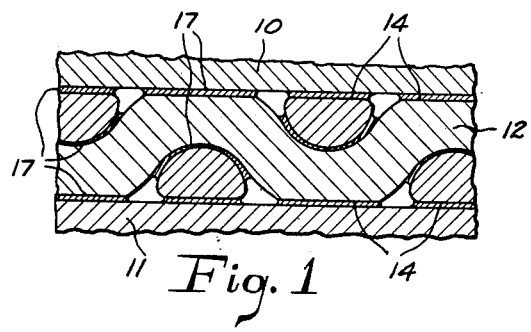

The invention provides a novel method of brazing a metal body 10 to a metal body 11, whereby the novel composite article illustrated in Fig. 1 is produced. The body 11 may be an impact element of a pulverizer, and it may be made of steel. The body 10 may be a plate of tungsten carbide which is to form an armor to protect one side of the body 11 from the abrasive action of material being pulverized. The adjacent surfaces of the two bodies 10 and 11 are flat and smooth.

Figure 2:
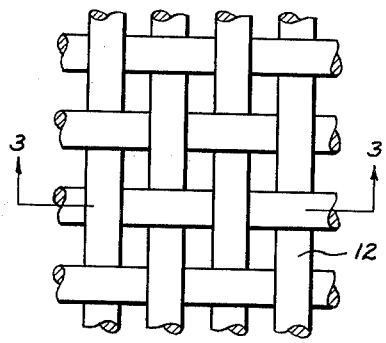
Fig. 2 is a fragmentary view of a woven wire screen.
Figure 5:
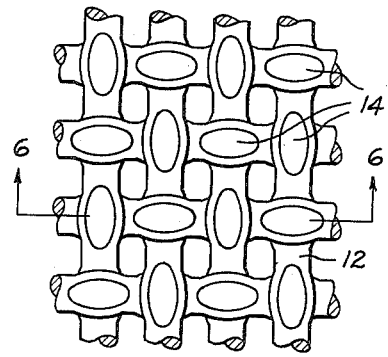
Fig. 5 is a fragmentary view of the screen after treatment.
Figure 3:
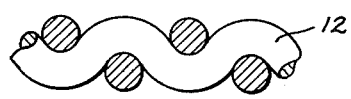
Fig. 3 is a section on the line 3—3 of Fig. 2.
Figure 6:
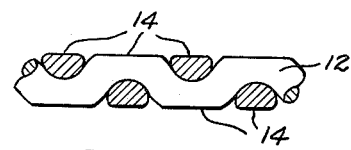
Fig. 6 is a section taken on the line 6—6 of Fig. 5.

In carrying out the invention a woven metal wire screen 12 is utilized. This screen is originally woven in the form shown in Figs. 2 and 3, of wire having a circular cross section and preferably made of substantially pure copper. The wire is preferably rather small in diameter and woven into a fine mesh. Wire having a diameter of .0135 inch, woven into a mesh 34 per inch by 40 per inch has proven satisfactory. While a 40 by 40 mesh might be slightly better, it is very difficult to weave by known apparatus, whereas the 34 by 40 mesh can be easily woven.

Figure 4:
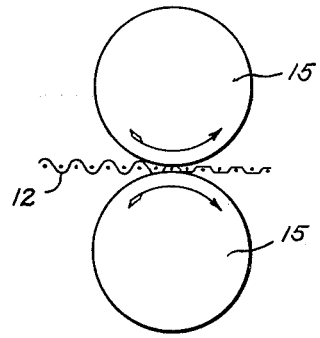
Fig. 4 is a diagrammatic view showing a treatment to which the screen is subjected.

Before the screen 12 is utilized, it is subjected to a treatment to form a multiplicity of flat areas or spots 14 on both sides thereof, which of course reduces the thickness of the screen. From an original thickness of approximately .027 inch the screen may be reduced to a thickness of say .020 inch. This is preferably brought about by feeding the screen between two parallel hard metal rolls 15—15, as indicated in Fig. 4. This rolling of the screen not only reduces its thickness and forms the flat spots 14 of generally elliptical shape thereon, but it also causes the wires to bulge laterally on opposite sides of each flat spot and otherwise deforms the wires so that the adjacent surfaces of the crossed wires conform more closely to one another.

In connection with the brazing operation there is employed a suitable brazing compound 17, for example a well known silver solder having approximately the following composition: silver 50%; cadmium 16%; copper 15½%; zinc 15½%; and nickel 3%. Such a silver solder is available in the form of thin sheets. Sheets approximately .005 inch thick are satisfactory.

Figure 7:
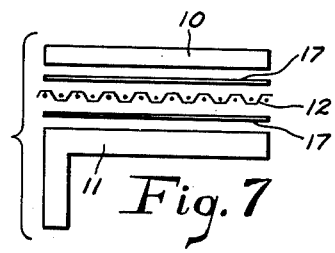
Fig. 7 is a view showing the arrangement of the parts prior to the brazing operation.

After application of a suitable flux, such as that disclosed in the patent to Phelan No. 1,835,965 dated December 8, 1931, the various parts are assembled in the manner shown in Fig. 7. The flattened screen 12 is located between two sheets of silver solder 17, and these parts are positioned between the two metal bodies 10 and 11. It is not necessary that flux be applied to all of the surfaces, provided there is a layer of flux between each pair of adjacent surfaces of the assembly. Thus it would be sufficient to apply flux to both sides of each sheet of silver solder 17. As an alternate procedure, the screen 12 may be dipped in flux, and flux may be applied to the adjacent surfaces of the bodies 10 and 11. Once the parts are assembled they are suitably clamped together and heated until the silver solder is melted and flows. This will ordinarily require a temperature of 1270 degrees F. or somewhat higher. As the solder flows, capillary action will cause it to distribute itself in the very narrow spaces between the flat areas 14 and the adjacent surfaces of the bodies 10 and 11, as well as in the very narrow spaces between the crossed portions of the wires of the screen 12, substantially as indicated in Fig. 1. The flux, with the oxides or other impurities collected thereby from the various metal surfaces, will be forced into the comparatively large voids or openings of the screen. The assembly will now be allowed to cool. Since tungsten carbide has a much smaller coefficient of heat expansion than steel, the steel body 11 will contract considerably more than the tungsten carbide body 10. The relatively soft copper screen 12 will yield as required to prevent any undue stressing of the bodies.

In the completed article, the multiplicity of flat spots 14 on the opposite sides of the screen 12 are very firmly bonded by the silver solder 17 to the adjacent flat surfaces of the bodies 10 and 11. Also the adjacent surfaces of the screen wires, which are deformed into close conformation by the rolling of the screen, are firmly soldered to one another. Thus a very firmly bonded composite article is produced.

Having thus described my invention, what I claim as new and desire to secure by Letters Patent is:

1. A method of brazing a body of tungsten carbide to a body of steel comprising the steps of feeding a screen of woven copper wire of circular cross section between two parallel rolls to reduce the thickness of the screen by forming a multiplicity of flat areas approximately elliptical in shape on its opposite sides and bulging the wire laterally adjacent each flat area, placing the screen, a suitable silver solder and a suitable flux between the bodies, pressing the bodies together, and heating the bodies until the silver solder melts and distributes itself in the very narrow spaces between the said flat areas and the adjacent surfaces of the bodies and in the very narrow spaces between the adjacent bulged portions of the crossing wires.

2. A composite article comprising two juxtaposed metal bodies having different coefficients of thermal expansion, one of the bodies being formed of tungsten carbide and the other of steel, a screen of woven copper wire of circular cross-section located between the bodies, the screen having been fed between two parallel rolls so that the thickness has been reduced by forming a multiplicity of flat areas approximately elliptical in shape on its opposite sides and by forming bulges in the wire laterally adjacent each flat area, and a thin layer of silver solder firmly bonding each of said flat areas to the adjacent body and the bulged portions of each wire to the adjacent bulged portions of the crossing wires.

References Cited in the file of this patent

UNITED STATES PATENTS

| Number | Name | Date |
|---|---|---|
| 788,093 | Clark | Apr. 25, 1905 |
| 1,078,380 | Reynolds | Nov. 11, 1913 |
| 2,337,322 | Gascoigne | Dec. 21, 1943 |
| 2,530,552 | Stoddard | Nov. 21, 1950 |